United States Patent
Pearson

[11] Patent Number: 5,387,068
[45] Date of Patent: Feb. 7, 1995

[54] METHOD AND SYSTEM FOR LOADING RIGID SHEET MATERIAL INTO SHIPPING CONTAINERS AT A WORK STATION AND END EFFECTOR FOR USE THEREIN

[75] Inventor: Thomas E. Pearson, Grosse Ile, Mich.

[73] Assignee: Ford Motor Company, Dearborn, Mich.

[21] Appl. No.: 162,546

[22] Filed: Dec. 6, 1993

[51] Int. Cl.⁶ ............................................. B65G 59/00
[52] U.S. Cl. .................................. 414/404; 294/65; 414/416; 414/798.5; 414/798.9
[58] Field of Search ............... 414/404, 416, 786, 737, 414/752, 798.5, 798.9; 901/35; 294/65

[56] References Cited

U.S. PATENT DOCUMENTS

| | | | |
|---|---|---|---|
| 3,168,184 | 2/1965 | Galvin . | |
| 3,178,041 | 4/1965 | Wheat | 414/798.5 |
| 3,598,263 | 8/1971 | Ehmke | 294/65 X |
| 3,630,389 | 12/1971 | Schmidt et al. . | |
| 4,266,905 | 5/1981 | Birk et al. | 414/627 |
| 4,553,892 | 11/1985 | Huffman et al. | 414/121 |
| 4,571,320 | 2/1986 | Walker | 294/65 X |
| 4,627,785 | 12/1986 | Monforte | 414/730 |
| 4,657,470 | 4/1987 | Clarke et al. | 414/627 |
| 4,685,714 | 8/1987 | Hoke | 294/65 X |
| 4,823,180 | 5/1989 | Ferrero | 294/65 X |
| 4,828,304 | 5/1989 | No et al. | 294/2 |
| 4,848,757 | 7/1989 | De Fazio | 267/150 |
| 4,884,938 | 12/1989 | Fujita et al. | 414/541 |
| 4,960,298 | 10/1990 | Moroi | 294/64.1 |
| 4,976,344 | 12/1990 | Hultberg | 414/798.5 |
| 5,102,114 | 4/1992 | Suda | 271/18 |
| 5,172,922 | 12/1992 | Kowalski et al. | 279/3 |
| 5,173,029 | 12/1992 | Delventhal et al. | 414/754 |
| 5,197,847 | 3/1993 | Kremer et al. | 414/752 |
| 5,207,553 | 5/1993 | Konagai | 414/737 |
| 5,256,030 | 10/1993 | Tanaka et al. | 414/798.9 |
| 5,290,134 | 3/1994 | Baba | 294/65 X |

FOREIGN PATENT DOCUMENTS

| | | | |
|---|---|---|---|
| 1191168 | 7/1985 | Canada | 414/798.5 |
| 2639335 | 5/1990 | France . | |
| 3018082 | 11/1981 | Germany | 294/65 |
| 127920 | 5/1988 | Japan | 414/798.5 |
| 88620 | 4/1991 | Japan | 294/65 |
| 87788 | 3/1992 | Japan | 414/737 |

Primary Examiner—David A. Bucci
Attorney, Agent, or Firm—Roger L. May; Joseph W. Malleck

[57] ABSTRACT

A robotic end effector adapted to be mounted at the end of an arm of a program-controlled robot is capable of providing compliance within a vertical plane. A method and system utilizing the end effector pick-up flat or curved glass panels from glass racks and place the glass panels into irregularly-shaped wooden crates. Due to the compliance provided by the end effector, the system allows essentially perfect piece-to-piece vertical edge-of-glass alignment during the packaging process so as to eliminate glass etching/scratching. The end effector includes a base frame on which compliance devices in the form of linear bearing systems support a number of material handling devices in the form of suction devices. Selected ones of the compliance devices can be locked out under the control of a controller for the robot. Each suction device includes a spring-biased suction cup to also provide compliance in a direction substantially normal to the compliance provided in the vertical plane.

18 Claims, 4 Drawing Sheets

METHOD AND SYSTEM FOR LOADING RIGID SHEET MATERIAL INTO SHIPPING CONTAINERS AT A WORK STATION AND END EFFECTOR FOR USE THEREIN

TECHNICAL FIELD

The invention relates to methods and systems for loading rigid sheet material into shipping containers at a work station and an end effector for use therein and, in particular, to methods and systems for loading glass panels into shipping containers at a work station and an end effector for use therein.

BACKGROUND ART

It is often necessary to repackage flat or curved glass from steel "leanback" glass racks and place the glass sheets into irregularly-shaped wooden crates for shipping. Such wooden crates are often warped and handmade. It is desirable to place such glass sheets into such low cost wooden crates quickly and in a repeatable fashion.

Previous attempts to load such glass sheets into such wooden crates employed known box location assumptions but ignored positional irregularities related to the box bottom or floor. One approach that has been used to detect such positional irregularities is to use a sensor to locate the bottom of the shipping crate.

The U.S. patents to Galvin U.S. Pat. No. 3,168,184; Fujita et al. U.S. Pat. No. 4,884,938; Suda U.S. Pat. No. 5,102,114; and Delventhal et al. U.S. Pat. No. 5,173,029 all disclose automated systems for transporting or repositioning a glass sheet. The Fujita et al. '938 patent in particular discloses a transfer and repositioning device including a three-dimensional movable carriage that incorporates a vacuum holding assembly that is tiltably and fixedly secured to a carriage.

The U.S. patents to Schmidt et al. U.S. Pat. No. 3,630,389; Monforte U.S. Pat. No. 4,627,785; Clark et al. U.S. Pat. No. 4,657,470; No et al. U.S. Pat. No. 4,828,304; Kowaleski et al. U.S. Pat. No. 5,172,922; Kremer U.S. Pat. No. 5,197,847; Konagai U.S. Pat. No. 5,207,553; and French patent Publication No. 2,639,335 all disclose end effector arrangements for use in combination with industrial robots. Each of the end effectors incorporate suction assemblies for holding a work article and many of the end effectors are spring-biased. In particular, the Kowaleski et al. '922 patent discloses a self-aligning vacuum end effector.

The DeFazio U.S. Pat. No. 4,848,757 discloses a compliance device which utilizes coil springs.

However, none of the prior patents noted above deal with a robotic system for repackaging glass panels into irregularity-shaped crates. It is highly desirable to utilize such crates for shipping purposes since such crates are typically very inexpensive compared to steel regularly-shaped crates which are returned for further use due to their costs.

SUMMARY OF THE INVENTION

An object of the present invention is to provide a method, a system and end effector for use therein to provide selective vertical compliance which compliance allows for packaging sheet material such as glass sheets into irregularly-shaped shipping crates.

Another object of the present invention is to provide a method, a system and end effector for use therein for automatically, rapidly and accurately repackaging flat or curved glass sheets into irregularly-shaped wooden shipping crates.

In carrying out the above objects and other objects of the present invention, a method is provided for loading a desired number of rigid sheets of material into a shipping container from a storage container at a work station. The work station includes a program-controlled robot having an end effector movable with respect to controlled axes. The end effector includes a base frame coupled to the robot and at least one material handling device supported on the base frame. The method includes the steps of: (a) moving the end effector with respect to the controlled axes to allow the at least one material handling device to pick up the at least one sheet of material from the storage container; and (b) moving the end effector with respect to the controlled axes to place the at least one sheet of material in the shipping container. The method also includes the steps of: (c) allowing the at least one material handling device to move relative to the base frame in an upward direction substantially opposite a downward direction of the base frame upon engagement of a bottom edge of the at least one sheet of material with a floor of the shipping container; and (d) releasing the at least one sheet of material after step (c) so that the at least one sheet of material is supported on the floor at its bottom edge. Finally, the method includes the step of repeating steps (a) through (d) until the desired number of sheets of material are supported at their bottom edges on the floor of the shipping container.

Further, in carrying out the above objects and other objects of the present invention, a system is provided for loading a desired number of rigid sheets of material into a shipping container from a storage container at a work station. The system includes a program-controlled robot having an arm provided with an end effector movable with respect to controlled axes, wherein the end effector includes a base frame coupled to the arm of the robot and at least one material handling device supported on the base frame to receive and retain at least one sheet of material. The system also includes a controller for (1) causing the robot to move the end effector with respect to the control axes to pick up the at lease one sheet of material from the storage container and place the at least one sheet of material in the shipping container, and (2) causing the at least one material handling device to receive, retain and then release the at least one sheet of material so that the at least one sheet of material is supported on a floor of the shipping container at a bottom edge of the at least one sheet of material. The end effector further includes a compliance device for supporting the at least one material handling device on the base frame to allow the at least one material handling device to move relative to the base frame in an upward direction substantially opposite a downward direction of the base frame upon engagement of the bottom edge of the at least one sheet of material with the floor of the shipping container and prior to release of the at least one sheet of material by the at least one material handling device.

Still further in carrying out the above objects and other objects of the present invention, an end effector is provided for use with a program-controlled robot to load a desired number of rigid sheets of material into a shipping container from a storage container at a work station. The end effector includes a base frame adapted to be mounted on the robot and at least one material handling device supported on the base frame. The at least one material handling device is adapted to receive and retain at least one sheet of material in the storage container and then release the at least one sheet of material in the shipping container so that the at least one sheet of material is supported on a floor of the shipping container at a bottom edge of the at least one sheet of material. The end effector further includes a compliance device for supporting the at least one material handling device on the base frame to allow the at least one material handling device to move relative to the base frame in an upward direction substantially opposite a downward direction of the base frame upon engagement of the bottom edge of the at least one sheet of material with the floor of the shipping container.

Preferably, the rigid sheets of material are glass panels. The shipping container is an irregularly-shaped crate and the storage container is a regularly-shaped glass rack.

Also preferably, the end effector includes a plurality of material handling devices supported at a plurality of space locations on the base frame to receive and retain a number of glass panels.

The advantages accruing to the use of the method, system and end effector of the present invention are numerous. For example, inexpensive, irregularly-shaped crates rather the regularly-shaped containers can be used to ship the glass sheets. Also, the method, system and end effector allow substantially perfect piece-to-piece vertical edge of glass alignment during the repackaging process from the glass racks to the irregularly-shaped crates. The edge of glass alignment is very important for quality and allows packing materials to be placed tightly against each piece of glass in the package effectively eliminating glass-to-glass relative motion. By eliminating this relative motion, glass etching/scratching is eliminated.

This compliance upon demand allows for accurate glass pick-up under a no compliance condition while allowing for rapid cycle times for glass placement/release under a compliant condition. The compliance allows for wood warpage, wood deformation under the applied weight of the glass and variations in metal dollies used to carry the wooden crates within a manufacturing plant.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
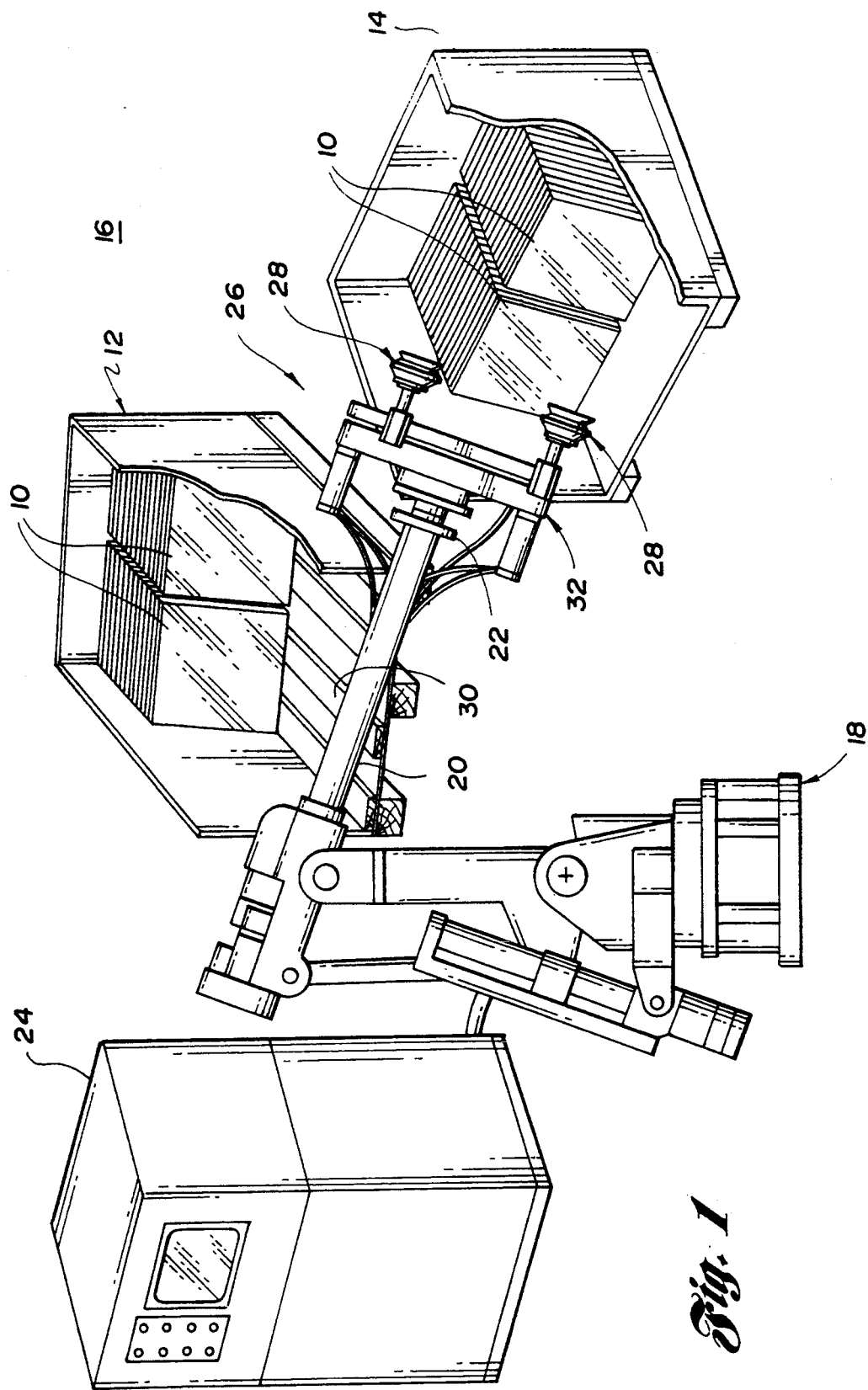
FIG. 1 is a schematic perspective view illustrating the method, the system and end effector of the present invention.

Referring now to the drawing figures, there is illustrated in FIG. 1 a system for loading a desired number of rigid sheets of material such as glass sheets or panels 10 into a wooden, irregularly-shaped shipping container or crate, generally indicated at 12, from a steel storage container or glass rack 14 at a work station 16.

The system also includes a program-controlled robot having model designation S-420F and sold by Fanuc Robotics North America of Auburn Hills, Mich. The robot 18 includes an arm 20 to which a wrist 22 is attached.

Figure 2:
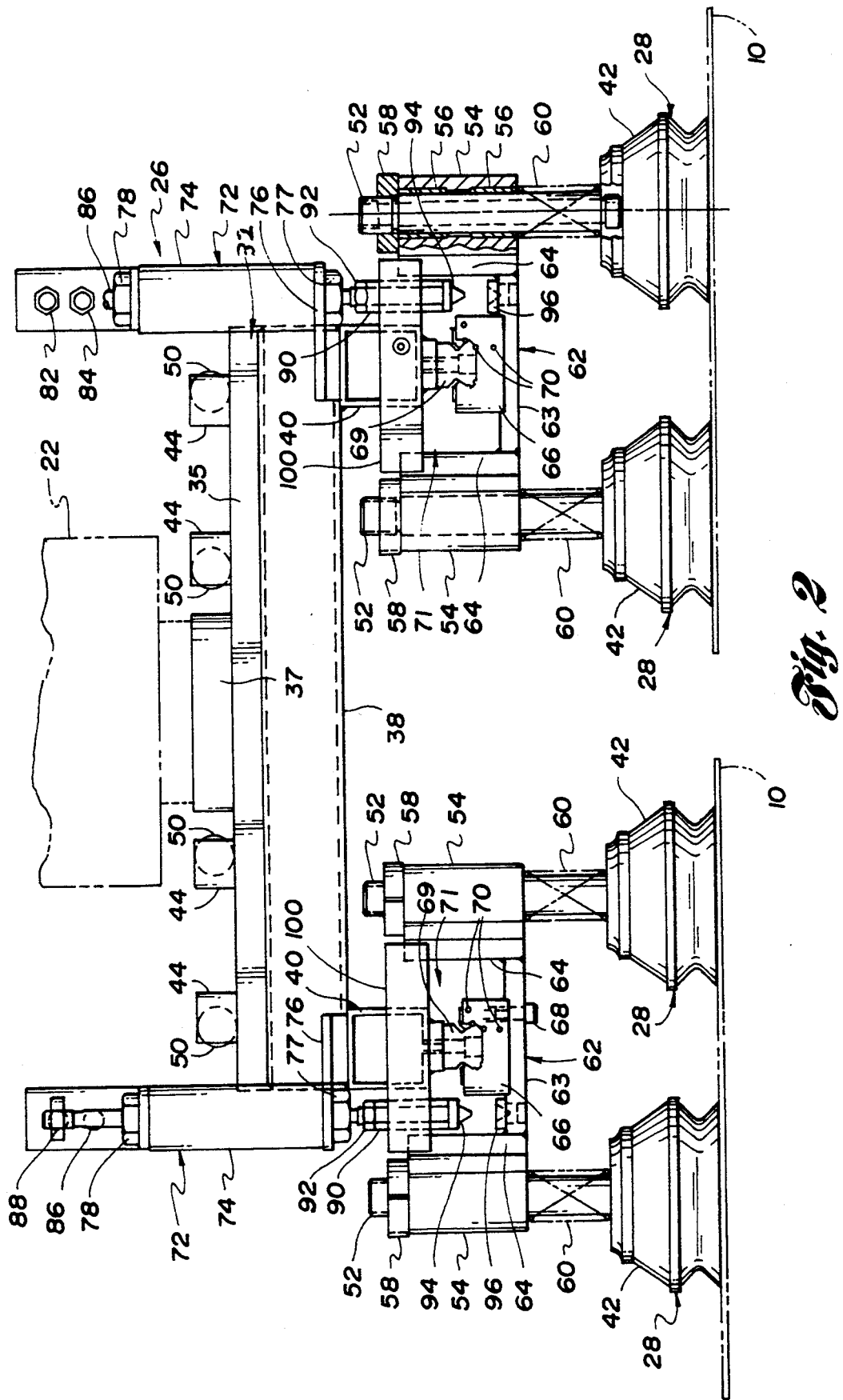
FIG. 2 is a top plan view, partially broken away and in cross-section, of the end effector of FIG. 1 with a wrist of the robot of FIG. 1 illustrated in phantom.

The robot 18 is controlled to move under program control by a controller 24. In turn, the robot 18 moves an end effector, generally indicated at 26, mounted at a distal end of the robot arm 20 at its wrist 22 with respect to controlled axes. The end effector 26 is controlled to move with respect to the controlled axes to allow the lower four of eight material handling devices such as a plurality of vacuum or suction devices, generally indicated at 28, to pick-up a pair of glass sheets from the storage container 14 as illustrated in FIGS. 1 and 2. Under program control, the robot 18 then rotates the end effector 26 180° to allow the upper four suction devices 28 to pick-up another pair of glass sheets Then the robot 18 moves the end effector 26 with respect to the controlled axis to place the four glass sheets 10 into the shipping container 12, two sheets at a time, so that the bottom edges of the glass sheets 10 are supported on a floor 30 of the shipping container 12.

In general, during placement of the pairs of glass sheets 10 in the container 12, the end effector 26 allows the lower four vacuum devices 28 to move in an upward direction in a vertical plane substantially opposite downward movement of a base frame, generally indicated at 32, of the end effector 26 upon engagement of the bottom edges of the glass sheets 10 with the floor 30 of the shipping container 12. Then the glass sheets 10 are released by the suction devices 28 under program control so that the glass sheets 10 are supported in stacks on the floor 30 of the shipping container 12. Then under program control, the robot 18 rotates the end effector 26 180° to allow the other four vacuum devices 28 to be vertically compliant and then release their respective glass sheets. This process is repeated until a desired number of sheets of glass are supported at their bottom edges on the floor 30 of the shipping container 12.

Figure 3:
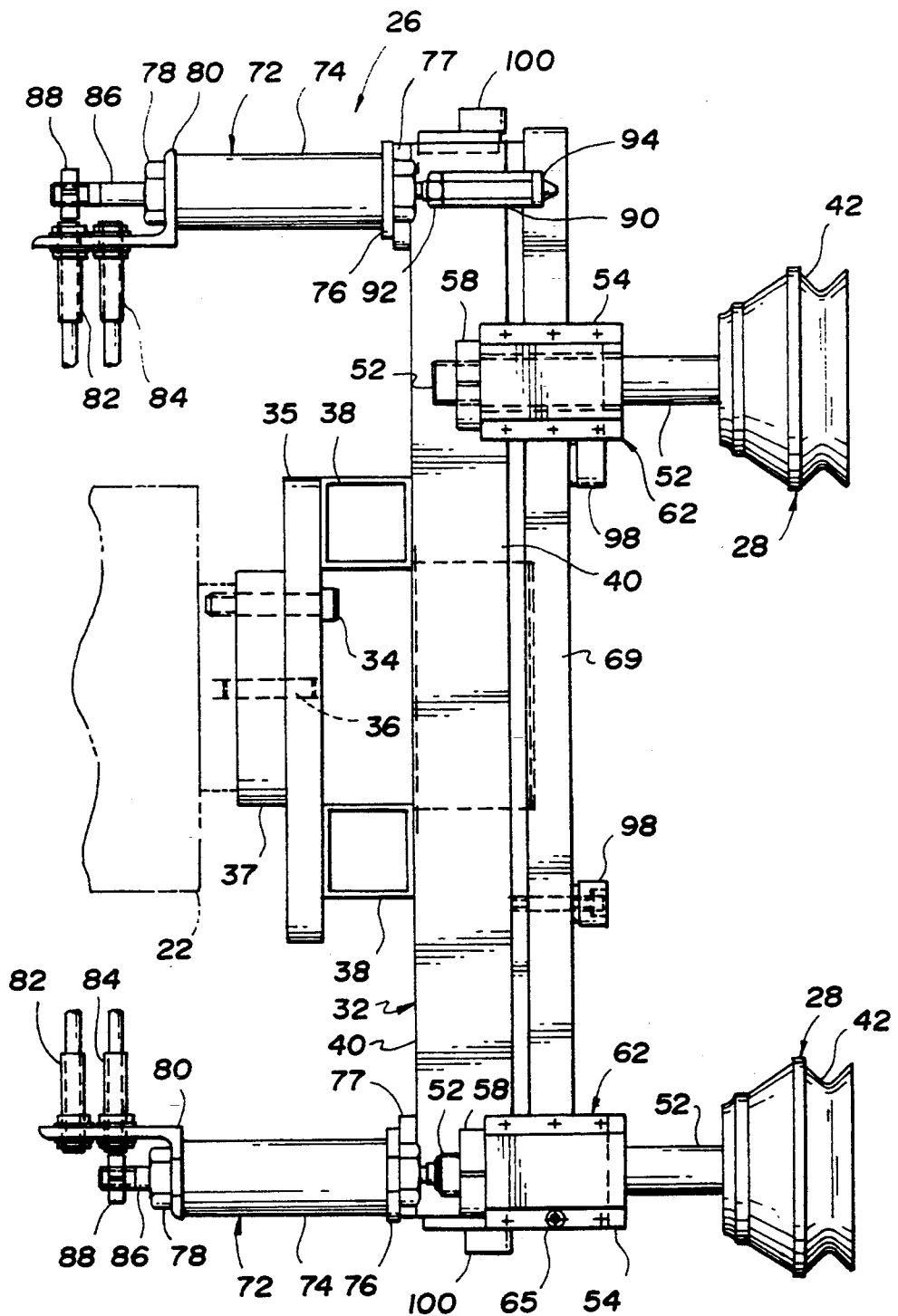
FIG. 3 is a side elevational view partially broken away of the end effector of FIG. 2.
Figure 4:
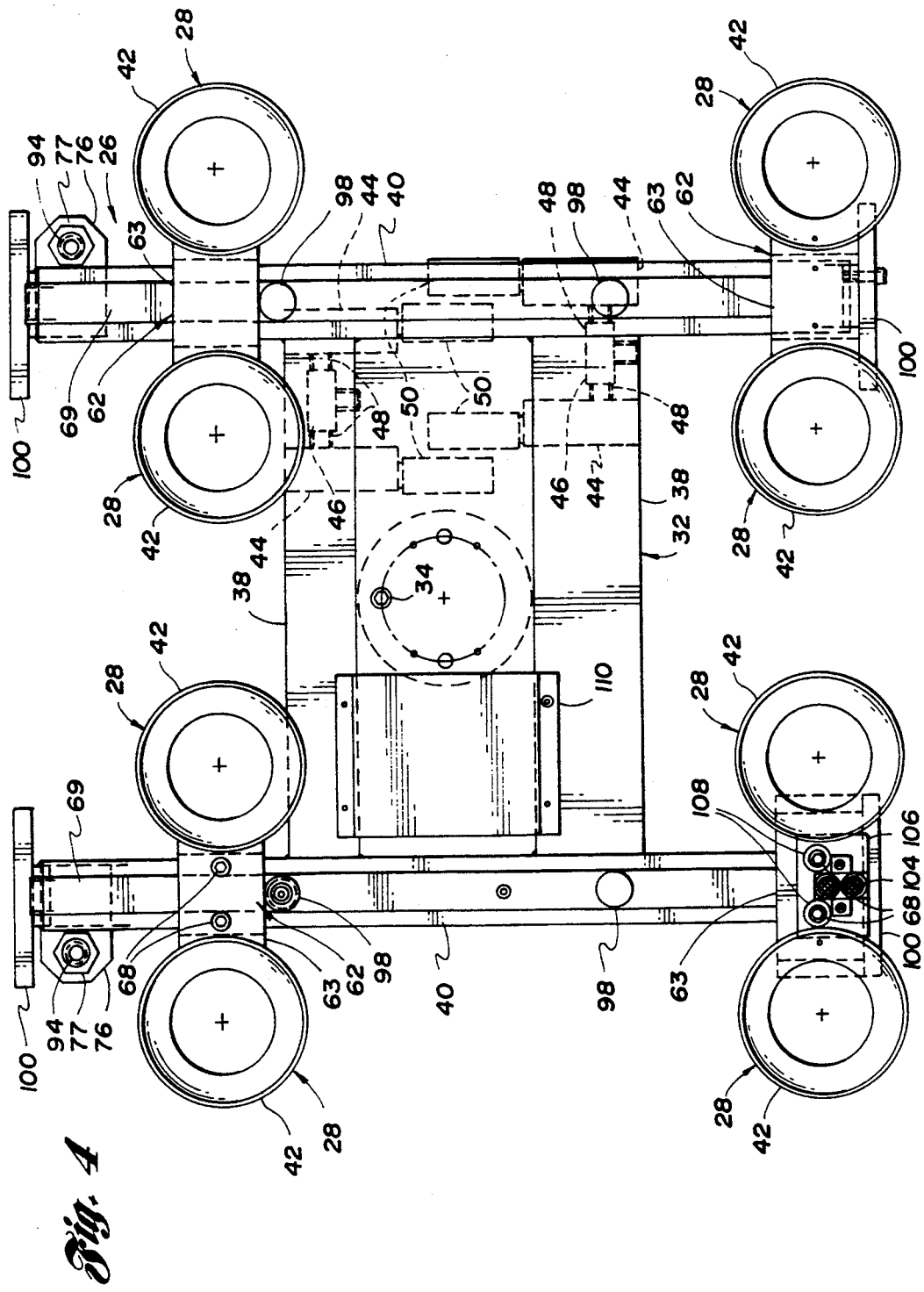
FIG. 4 is a front elevational view of the end effector of FIG. 1.

Referring now to FIGS. 2–4, there is illustrated in detail the end effector 26 for use in the method and system of the present invention. In general, the base frame 32 is a weldment adapted to be connected to the robot wrist 22 by means of a plurality of bolts 34, dowel pins 36, and plates 35 and 37. The base frame 32 has a plurality of aluminum square tubes including horizontally extending tubes 38 and vertically extending tubes 40 which are welded to each other to provide the base frame 32.

Preferably, there are eight suction devices 28 provided on the end effector 26 to handle four sheets of glass at a time in transporting the glass sheets 10 from the storage container 14 to the shipping container 12. Obviously, the number of glass sheets that can be transferred is dependent on the number and spacing of the suction devices 28 and the size of the glass sheets. As previously mentioned by rotating the end effector 26 180°, the upper as well as the lower row of suction devices 28 as shown in FIG. 4 can be utilized to receive and retain pairs of glass sheets 10 from the storage container 14 prior to transporting the entire load of four sheets 10 of glass to the shipping container 12 at which point the lower pair of glass sheets 10 are placed on the floor 30 of the shipping container 12. Then the end effector 26 is rotated 180° so that the second pair of glass sheets 10 can be placed on the floor 30 of the shipping container 12.

Preferably, each of the suction devices 28 includes a suction cup 42 which is in fluid communication with its respective vacuum generator 44 which is mounted on a back surface of the base frame 32. The vacuum generators 44 are responsive to control signals from the controller 24 to create a vacuum at the desired suction cups 42 sufficient to retain the glass sheets 10. Pairs of the suction cups 42 are fluidly connected to corresponding pairs of the vacuum generators 44 which, in turn, are fluidly interconnected by a T-shaped pipe 46 by means of nipples 48. A silencer 50 is connected to each of the vacuum generators 44 to control the noise generated by the vacuum generators 44.

Each suction device 28 further includes a hollow suction cup shaft 52 which is mounted within a bearing housing 54 by bearings 56. The suction cup shaft 52 supports the suction cup 42 at one end thereof and is fixedly secured to the bearing housing 54 by a clamping collar 58 at its opposite end. Hoses (not shown) fluidly communicate the vacuum generators 44 to respective suction cups shafts 52 and, consequently, to their respective suction cups 42 to provide the amount of vacuum necessary to hold the glass sheets 10 during movement thereof.

A compression spring 60 extends between each of the bearing housings 54 and its respective suction cup 42 to provide compliance for the suction cups 42 in a direction substantially normal to a vertical plane in which compliance is also provided as described hereinbelow.

Pairs of such vacuum devices 28 are supported on a U-shaped carriage or slide mount, generally indicated at 62. Each slide mount 62 includes a base part 63 welded to wall parts 64. The bearing housings 54 are secured, such as by bolts 65, to the wall parts 64.

Each slide mount 62 also includes a translating carriage 66 fixedly secured to the base part 63 such as by bolts 68. Each carriage 66 is slidably mounted on a rail 69 which in turn is fixedly secured to the vertically extending square tubing Circulating linear bearings 70 are provided within each of the carriages 66 which together with its respective rail 69 define a linear bearing system or compliance device, generally indicated at 71, for associated pairs of the vacuum devices 28.

A locking means or mechanism, generally indicated at 72 includes a pneumatic locking cylinder 74 for selectively locking each of the compliance devices 71 in response to a control signal from the controller 24 to prevent relative vertical movement between its respective vacuum device 28 and the base frame 32. Each of the pneumatic locking cylinders 74 is mounted on the base frame 32 by means of a cylinder mounting bracket 76 and a nut 77.

A mounting nut 78 secures a mounting bracket 80 to the cylinder 74. In turn, the bracket 80 supports a pair of inductive proximity switches 82 and 84. A rod 86 of the air locking cylinder 74 has a clamp collar 88 supported thereon for movement therewith. The clamp collar 88 is either disposed above the proximity switch 82 or the proximity switch 84 depending upon whether the rod 86 is in its extended or retracted position. The proximity switches 82 and 84 provide feedback signals to controller 24 to indicate whether its respective locking mechanism 72 is locked or not.

The opposite end of each rod 86 is connected to a cylinder adaptor 90 at one end thereof by means of a hexagonal nut 92. At the opposite end of the adaptor 90 there is disposed a cone locating pin 94 which, in its extended position, engages a cone locking bushing 96 mounted on each of the base parts 63 to lock its carriage 62 in position to prevent undesired movement of the carriage 62 such as during rotation of the end effector 26.

Inner and outer stops 98 and 100, respectively, are mounted to their respective vertical beams 40 and are provided for each of the carriages 62 to limit the vertical movement of the carriages 62 along their rails 67 to thereby provide a limited amount of compliance in the vertical plane for the suction devices 28.

As illustrated in FIG. 4, the end effector 26 also includes a non-contact sensor 104 which is mounted on a sensor mounting 106 and secured thereto by means of the bolts 68 and washers 108. The sensor 104 provided thereon provides a signal which can be utilized by the controller 24 to determine location of the sheets of glass 10 within the storage container 14 to aid in the pick-up of such sheets of glass 10. Preferably, the non-contact sensor 104 is an ultrasonic sensor. However, the sensor 104 could also be a laser-type sensor.

The sensor 104 is electrically coupled to a sensor circuit board 110 which is also fixably secured to the horizontal tubes 38 of the end effector 26. The circuit board 110 receives a signal from the sensor 104 and provides an appropriate output signal to the controller 24 so that the controller 24 can send the appropriate control signals to the robot 18 to control the end effector 26.

In summary, the car's passive compliance in the vertical plane is under computer control of the controller 24 and can be locked out or released by engaging or disengaging one or more of the pneumatic locking cylinders 74. Each suction cup 42 has a spring-biased compliance that allows for passive compliance-upon-demand normal from the direction of passive compliance-upon-demand of the linear bearing systems in a vertical plane.

Also, in summary, the above-described cooling system allows for multiple glass handling requirements such as: (1) multiple pieces of glass can be handled at one time. The compliance devices 71 will allow for the tooling to be rotated 180° and still be effective. (2) Single pieces of glass can be handled by eliminating compliance on the top suction cups 42 during the glass pick-up process. (3) 90 degree rotation placement is possible since compliance can be removed during pick-up with the end effector rotated 90 degrees out-of-position. Then during setdown/release of the glass, the end effector 26 is rotated back 90 degrees to allow the compliance devices 71 to operate.

While the best mode for carrying out the invention has been described in detail, those familiar with the art to which this invention relates will recognize various alternative designs and embodiments for practicing the invention as defined by the following claims.

I claim:

1. A system for loading a desired number of rigid sheets of material into a shipping container from a storage container at a work station, the system comprising:
   a program-controlled robot having an arm provided with an end effector movable with respect to controlled axes, wherein the end effector includes a base frame coupled to the arm of the robot and at least one material handling device supported on the base frame to receive and retain at least one sheet of material; and a controller for (1) causing the robot to move the end effector with respect to the control axes to pick up the at least one sheet of material from the storage container and place the at least one sheet of material in the shipping container; (2) causing the at least one material handling device to receive, retain and then release the at least one sheet of material so that the at least one sheet of material is supported on a floor of the shipping container at a bottom edge of the at least one sheet of material; and (3) generating first and second control signals and wherein the end effector further includes a compliance device for supporting the at least one material handling device on the base frame to allow the at least one material handling device to move freely relative to the base frame in an upward direction substantially opposite a downward direction of the base frame upon engagement of the bottom edge of the at least one sheet of material with the floor of the shipping container and prior to release of the at least one sheet of material by the at least one material handling device; and locking means responsive to the first and second control signals for selectively locking the compliance device in response to the first control signal to prevent relative movement between the at least one material handling device and the base frame wherein passive compliance provided by the compliance device is locked out in response to the first control signal and passive compliance provided by the compliance device is released in response to the second control signal, the locking means allowing the compliance device to operate so that the at least one material handling device can move freely relative to the base frame in the upward direction.

2. The system as claimed in claim 1 wherein the rigid sheets of material are glass panels.

3. The system as claimed in claim 1 wherein the shipping container is an irregularly-shaped crate.

4. The system as claimed in claim 1 wherein the storage container is a regularly-shaped glass rack.

5. The system as claimed in claim 1 wherein the end effector includes a plurality of material handling devices supported at a plurality of spaced locations on the base frame to receive and retain a number of sheets of material.

6. The system as claimed in claim 5 wherein each of the material handling devices is a suction device.

7. An end effector for use with a program-controlled robot to load a desired number of rigid sheets of material into a shipping container from a storage container at a work station, the end effector comprising:

a base frame adapted to be mounted on the robot;

at least one material handling device supported on the base frame, the at least one material handling device being adapted to receive and retain at least one sheet of material in the storage container and then release the at least one sheet of material in the shipping container so that the at least one sheet of material is supported on a floor of the shipping container at a bottom edge of the at least one sheet of material;

a compliance device for supporting the at least one material handling device on the base frame to allow the at least one material handling device to move freely relative to the base frame in an upward direction substantially opposite a downward direction of the base frame upon engagement of the bottom edge of the at least one sheet of material with the floor of the shipping container; and locking means responsive to first and second control signals for selectively locking the compliance device in response to the first control signal to prevent relative movement between the at least one material handling device and the base frame wherein passive compliance provided by the compliance locked out in response to the first control signal and passive compliance provided by the compliance device is released in response to the second control signal, the locking means allowing the compliance device to operate so that the at least one material handling device can move freely relative to the base frame in the upward direction.

8. The end effector of claim 7 further including a plurality of material handling devices supported at a plurality of spaced locations on the base frame to receive and retain a number of sheets of material.

9. The end effector of claim 8 wherein each of the material handling devices is a suction device.

10. The end effector as claimed in claim 8 further including a number of compliance devices and wherein the material handling devices are supported on the base frame by the compliance devices.

11. The end effector as claimed in claim 7 wherein the compliance device includes a linear bearing system.

12. The end effector as claimed in claim 11 wherein the linear bearing system includes a rail fixedly supported on the base frame and a translating carriage slidably supported on the rail for supporting the at least one material handling device.

13. The end effector as claimed in claim 7 wherein the locking means includes at least one pneumatic cylinder.

14. The end effector as claimed in claim 9 wherein each of the suction devices includes a suction cup.

15. The end effector as claimed in claim 14 wherein each of the suction devices includes a vacuum generator mounted on the base frame and in fluid communication with its respective suction cup.

16. The end effector as claimed in claim 14 further comprising springs for biasing the suction cups so that the suction cups are biased in a direction substantially normal to compliance provided by the compliance device.

17. The end effector as claimed in claim 7 further comprising a sensor supported thereon for generating a signal which can be utilized to determine location of the at least one sheet of material within the storage container.

18. The end effector as claimed in claim 17 wherein the sensor is a non-contact sensor.

* * * * *